United States Patent
Heraud et al.

(10) Patent No.: US 9,400,068 B2
(45) Date of Patent: Jul. 26, 2016

(54) CRIMP-ON PIPE CONNECTION ACCESSORY

(75) Inventors: Stephane Heraud, Paris (FR); Christian Bernardot, Plaisir (FR); Daniel Lecroc, Plaisir (FR)

(73) Assignee: PERMASWAGE, Les Clayes Sous Bois (FR)

(*) Notice: Subject to any disclaimer, the term of this patent is extended or adjusted under 35 U.S.C. 154(b) by 115 days.

(21) Appl. No.: 12/295,289

(22) PCT Filed: Mar. 23, 2007

(86) PCT No.: PCT/FR2007/000498
§ 371 (c)(1),
(2), (4) Date: Sep. 29, 2008

(87) PCT Pub. No.: WO2007/110501
PCT Pub. Date: Oct. 4, 2007

(65) Prior Publication Data
US 2009/0045621 A1    Feb. 19, 2009

(30) Foreign Application Priority Data
Mar. 29, 2006    (FR) ...................................... 06 51091

(51) Int. Cl.
*F16L 13/14*    (2006.01)
*F16L 13/10*    (2006.01)
*F16L 23/024*    (2006.01)

(52) U.S. Cl.
CPC ............... *F16L 13/103* (2013.01); *F16L 13/14* (2013.01); *F16L 23/024* (2013.01)

(58) Field of Classification Search
USPC .................... 285/382, 382.1, 382.2, 915, 256; 29/508, 515, 516
See application file for complete search history.

(56) References Cited

U.S. PATENT DOCUMENTS

| 1,911,775 | A | * | 5/1933 | Smith et al. ................ 285/382.2 |
| 3,068,563 | A | * | 12/1962 | Reverman ................. 285/382.2 |
| 3,343,252 | A | * | 9/1967 | Reesor ....................... 285/382.2 |
| 3,572,779 | A |  | 3/1971 | Dawson |
| 4,371,199 | A |  | 2/1983 | Kushner et al. |
| 4,482,174 | A |  | 11/1984 | Puri |
| 4,768,275 | A | * | 9/1988 | Schmitz ........................ 285/382 |
| 5,080,406 | A | * | 1/1992 | Hyatt et al. ................ 285/382.2 |
| 6,619,701 | B1 |  | 9/2003 | Udhofer |
| 6,692,040 | B1 | * | 2/2004 | McKay et al. ................ 285/382 |

FOREIGN PATENT DOCUMENTS

| DE | 4111279 C1 | 5/1992 |
| DE | 19609257 A | 9/1997 |
| DE | 19925024 A1 | 12/2000 |
| EP | 1195550 A2 | 4/2002 |
| FR | 2126485 A | 10/1972 |
| JP | 02063726 A | 3/1990 |
| JP | 03056789 A | 3/1991 |

(Continued)

*Primary Examiner* — David E Bochna (74) *Attorney, Agent, or Firm* — Browdy and Neimark, PLLC (57) ABSTRACT

A pipe connection accessory 1 comprising a sleeve 4 designed to be crimped onto one end of a pipe tube and designed to engage at least indirectly with another pipe element, is characterized in that that surface 4A of the sleeve which is intended to come into crimped contact with the end of the tube comprises an adhesive-coated portion 10 comprising an adhesive made up of at least two components, one of which is encapsulated. This adhesive-coated portion is advantageously set back, preferably with projecting collars.

27 Claims, 4 Drawing Sheets

(56) References Cited

FOREIGN PATENT DOCUMENTS

| JP | 06006346 | B2 | 1/1994 |
|----|----------|----|--------|
| JP | 06117585 | A | 4/1994 |
| JP | 738732 | U | 7/1995 |
| JP | 11141758 | A | 5/1999 |
| JP | 2002161992 | A | 6/2002 |
| JP | 2006034072 | A | 2/2006 |
| NL | 8203087 | A | 8/1983 |
| WO | 8202755 | A | 8/1982 |

* cited by examiner

CRIMP-ON PIPE CONNECTION ACCESSORY

FIELD

The invention concerns an accessory for connecting pipes, the connection preferably, although not necessarily, being demountable.

BACKGROUND

A connection of this type is known in particular from the document U.S. Pat. No. 3,572,779, which describes a connection accessory formed of two parts crimped to the respective ends of two pipes; these two parts can be fastened to each other or screwed to each other.

Also known is the document WO-82/02755, which discloses an accessory including a sleeve intended to be crimped to the end of a first pipe and a fitting adapted to establish a connection with a complementary fitting mounted at the end of another pipe; in the above document this sleeve and this fitting have different hardness (or ductility) properties, i.e. the sleeve is sufficiently ductile to enable fixing by crimping whereas the fitting is sufficiently hard to locate effectively against the complementary fitting to obtain a good seal. The above document proposes a number of options for obtaining this difference in mechanical properties, including softening the sleeve part of a component initially having the hardness required for the fitting or hardening the fitting part of a component initially having the ductility required for the sleeve.

In practice the sleeve is crimped to the outside of the end of the pipe to be connected and the geometry of the exterior surface of the sleeve resists pulling out from this end (for example thanks to a longitudinal profile including a concave portion and a convex part) and rotation relative to that end (for example by means of flats).

However, the enhanced performance required of such connection accessories leads to an ongoing search for improvements, notably with regard to preventing rotation of the accessory relative to the pipe. It should be noted here that, if the accessory is used for a screwed connection, there is a risk of any rotation of one of the fittings relative to the other fitting degrading the quality of the crimp.

There is therefore a need to develop a pipe connection accessory (or connector, for short) that has, under given crimping conditions vis-à-vis a given pipe, improved resistance to rotational separation of the sleeve and the pipe.

There are various ways to achieve this.

Thus increasing the number of raised and recessed portions on the sleeve part may be considered, for improved fastening. However, as in the document cited above this sleeve is made from a ductile material, it follows that these raised and hollow portions are deformed during crimping; thus the raised portions are blunted, which minimizes the fastening effect of the raised and recessed portions. The increased resistance to rotational separation obtained in this way is therefore somewhat modest.

Increasing the amplitude of the corrugations between the concave and convex portions is not very effective either, given that the material constituting the connector is often subject to only a small amount of work hardening, especially if that material is aluminum for reasons of lightness, with the result that increasing the crimping force does not greatly increase the radial pressure between the pipe and the connector; to the contrary, such corrugations can degrade the fatigue resistance of the connector.

Depositing fixed abrasive particles on the surface of the sleeve that is intended to be crimped to the end of the pipe (or alternatively to its interior) may also be considered. However, if such particles are sufficiently hard not to be crushed during crimping, their hardness has the drawback that there is a risk of them causing cracks in the sleeve or in the end of the pipe, which seriously degrades fatigue performance.

In fact, the variety of options for adapting the connectors to improve resistance to rotation after crimping is restricted by the fact that in practice there is a requirement not to modify the conditions for fitting such connectors (or at least not to modify them significantly); these conditions are already sometimes very constraining, notably from the point of view of the accessibility of the pipes, which would appear to rule out further complicating the connector crimping conditions.

SUMMARY

An object of the invention is to propose a connection accessory, or connector, having improved resistance to rotational separation after crimping to the end of a pipe (or tube, hose, etc.) without degrading other aspects of the mechanical performance of the crimped assembly, notably its fatigue performance, and without necessitating significant modification of the conditions for crimping on this kind of accessory.

To this end the invention proposes a connection accessory for pipes, including a sleeve adapted to be crimped to one end of a pipe tube and adapted to cooperate at least indirectly with another pipe element, characterized in that the surface of the sleeve that is adapted to come into crimping contact with the end of the tube includes at least one portion coated with an adhesive comprising at least two components one of which is encapsulated.

The other pipe element can in particular be another pipe tube or a fluid inlet or outlet fitting.

Clearly the invention proposes to use an adhesive even though that would seem a priori to be incompatible with the requirement not to modify the connector fitting conditions; it would seem unrealistic to require an operative responsible for fitting such accessories to spread adhesive onto the surface of the sleeve intended to come into contact with the end of the pipe or to make sure that the adhesive is still sufficiently fluid to provide a good bond on crimping.

However, the invention exploits the fact that there exist multicomponent adhesives one component of which is encapsulated and therefore does not come into contact with the rest of the adhesive until the capsules burst, and therefore at the time of crimping, i.e. at the time that the adhesive bonding is to be carried out. Furthermore, adhesives including an encapsulated component include polymerizable adhesives, i.e. adhesives hardened by the user by means of an input of energy that is easy to provide during a crimping operation (in particular by an increase of temperature or pressure or by generation of UV radiation). This is why, according to one preferred feature of the invention, the adhesive used is a polymerizable adhesive.

Note, however, that activation by UV radiation implies a specific operation and may not occur homogeneously within the crimped layer, and that activation by heat also implies a specific operation which, although it produces a more homogeneous effect than UV radiation, nevertheless has the drawback of a risk of modifying the crystal structure of the connector or of the pipe end: clearly an adhesive polymerizable by pressure is the optimum choice here, since, at the same time, crimping bursts the capsules, brings the components of the adhesive into contact and activates the adhesive to cure it. This is why, according to one preferred feature of the invention, the polymerizable adhesive is one that is polymerized by application of pressure.

According to another preferred feature of the invention, the surface portion that is coated with said adhesive is situated at a distance from the ends of the sleeve, which has the advantage that it leaves on the surface of the sleeve intended to be in contact with the end of the pipe end portions that are not coated with adhesive. These end portions that are not coated with adhesive help to prevent the adhesive spreading on crimping; what is more, these end portions have the advantage of allowing the presence at the free end of the accessory of a coating of a material such as PTFE to avoid the phenomenon of fretting corrosion and a seal at the end of the sleeve near the fitting.

There is advantageously only one portion coated with adhesive. Alternatively, there can be separate longitudinally offset portions coated with adhesive, but a single portion coated with adhesive maximizes the improvement in mechanical performance.

In particular, if the surface of the sleeve that is intended to come into contact with the end of the pipe is the inside surface, this single portion coated with adhesive preferably extends over an axial distance representing from 0.5 D to D, where D is the diameter of the surface having this portion coated with adhesive, and preferably from 0.6 D to 0.9 D. Furthermore, this portion coated with adhesive is advantageously at a distance from the free end of the accessory from 0.5 D to D.

The sleeve preferably has, on its other surface radially opposite the surface including the portion coated with adhesive, an area with a corrugated longitudinal profile, so that crimping produces longitudinal variations of deformation, encouraging good axial retention between the sleeve and the end of the pipe. This corrugated area advantageously has at least approximately a transverse plane of symmetry, which contributes to homogeneous crimping over all the length of the portion coated with adhesive. In a geometry that is particularly simple but nevertheless effective, this corrugated area is formed by an annular bead between two annular depressions with the depressions set back relative to the rest of said other surface whereas the bead is advantageously at least at approximately the same level as the rest of said other surface, which simplifies the fabrication of the sleeve. Alternatively, this corrugated area includes two beads on either side of a depression.

This corrugated area is advantageously centered longitudinally on the portion coated with adhesive, i.e. has a central transverse plane that is also substantially a transverse central plane of the portion coated with adhesive.

The transverse central plane of the corrugated area is preferably at a distance from the free end of the accessory that is from 0.5 D to 1.5 D, where D is the diameter of the surface having the portion coated with adhesive.

The amplitude of the corrugations of this corrugated area is advantageously from the order of 1% to the order of 10% of the outside diameter of the sleeve, typically of the order of 5%.

The portion coated with adhesive is advantageously radially set back relative to the surface of the sleeve on either side of this portion coated with adhesive, which contributes to good compression of the adhesive on crimping, without spreading.

This portion coated with adhesive is advantageously set back a distance in the order of one tenth of a millimeter (for example from 0.05 to 0.2 mm), which allows the presence of a thick layer of adhesive without this projecting significantly vis-à-vis the rest of the surface including this portion coated with adhesive.

It is particularly advantageous if this portion coated with adhesive includes projecting collars. These contribute to retaining the adhesive in place during application of crimping forces. Furthermore, these collars advantageously project to a distance less than the setting back depth, with the result that they are in practice covered with adhesive, which guarantees that, on crimping, the adhesive situated on these collars is sufficiently compressed for the capsules to burst, for the components of the adhesive come into contact, and for a good bond to be established at the circumference of the collars. It should be noted that it is not necessary for the adhesive situated between these collars to be completely compressed and polymerized; the existence of mechanically weaker areas between areas of very good bonding (the collars) has the advantage of conferring on the crimped assembly a capacity to resist forces such as bending forces without the areas of very good bonding inducing cracks.

The collars are advantageously distributed homogeneously over the whole length of the portion coated with adhesive.

The height of the projecting collars is advantageously from one third to two thirds the setting-back depth of the portion coated with adhesive, and preferably of the order of half that depth. Moreover, the longitudinal dimension (or width) of the collars is advantageously from 10% to 30% (and preferably of the order of 25%) of the pitch of these collars.

The connection accessory can consist only of the sleeve, which can be conformed to cooperate with a complementary part capable of establishing a connection with another pipe element (tube or inlet/outlet fitting of a device, for example). This accessory can also include a portion fastened to the sleeve, for example a fitting adapted to locate against a complementary fitting mounted at the end of the other pipe tube; this portion can also be a second sleeve fastened to the first and crimped to the end of this other pipe tube.

BRIEF DESCRIPTION OF THE DRAWINGS

Objects, features and advantages of the invention emerge from the following description given by way of nonlimiting illustrative example and with reference to the appended drawings, in which.

DETAILED DESCRIPTION

Figure 1:
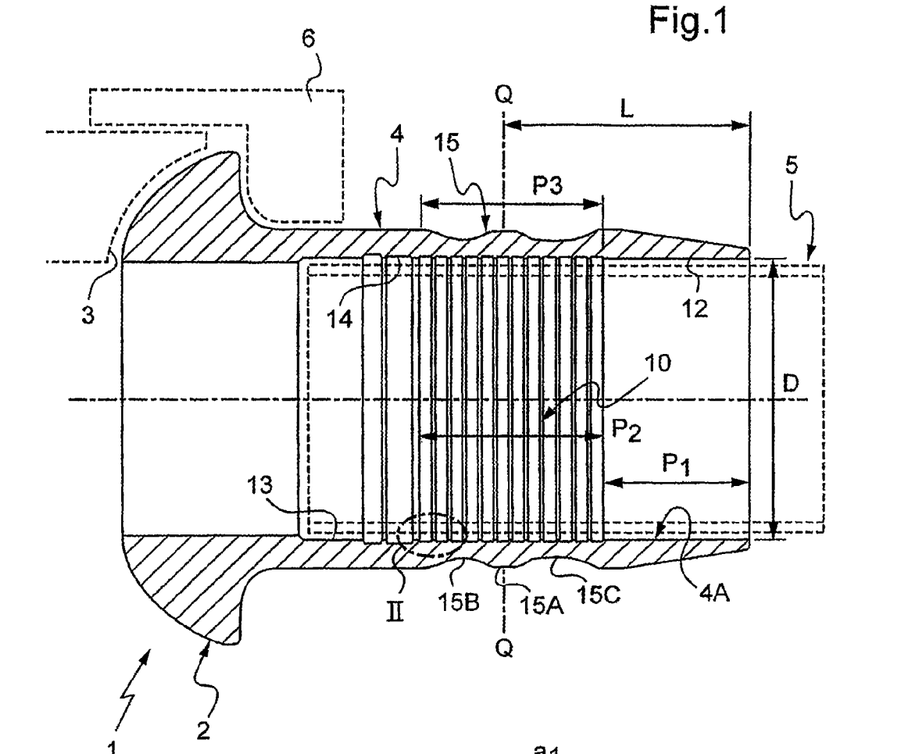
FIG. 1 is a view in axial section of a connection accessory of the invention.

FIG. 1 represents a connection accessory of the invention.

To be more precise, this accessory 1 includes a fitting 2 adapted to locate against a complementary fitting 3 (shown in dashed line in FIG. 1) and a sleeve 4 adapted to be crimped to the end of a pipe 5 (also shown in dashed line). In the embodiment shown, the fitting 2 is a male fitting, the fitting 3 is a female fitting and the fittings are clamped together by means of a nut 6 (also shown in dashed line); furthermore, crimping is effected here (see also FIGS. 3 and 5) after engaging the sleeve over the outside of the end of the pipe: the surface of the sleeve intended to come into contact with this end is therefore the inside surface 4A of the sleeve. In an alternative that is not shown, the sleeve is crimped to the inside of the end of the pipe (the person skilled in the art sometimes refers to this as swaging rather than internal crimping).

According to the invention, this surface 4A of the sleeve that is adapted to come into contact with the end of the pipe 5 includes a portion 10 coated with adhesive, the longitudinal dimension of which is designated P2 in FIG. 1. This portion is coated with an adhesive (11, FIG. 2) consisting of a number of components, one of which is encapsulated: as a result, when the capsules are intact, there is no contact between the components of the adhesive, and therefore no hardening of the adhesive. As a result the accessory can be coated during its fabrication, regardless of the time that will then elapse prior to crimping it on: this accessory coated with adhesive retains its bonding capacity during storage, if any.

In practice the capsules in which a component of this kind of adhesive can be confined have a maximum diameter of the order of a few hundredths of a millimeter.

The adhesive is advantageously polymerizable, so that it can be hardened at a time chosen by the operative. Of polymerizable adhesives having at least one encapsulated component, the invention recommends choosing an adhesive that is polymerized by applying pressure.

For example, the multicomponent pressure polymerizable adhesive is a 3M adhesive resin known as "Scotch-Grip"® 2353 or 2510; these automobile structural adhesives are designed to lock screwed fixings (they are coated onto the threads and then dried in an oven). Note that this kind of screwed fixing addresses a technical problem different from that targeted by the present invention: whereas locking a screwed fixing serves to render irreversible a connection that is initially reversible, crimping is essentially irreversible; moreover, locking a screwed connection prevents unscrewing, i.e. the reverse of the fixing movement, whereas adhesive bonding during crimping improves mechanical strength, axially and circumferentially, after application of different forces, namely radial forces.

As seen in FIG. 1, the portion 10 coated with adhesive is advantageously situated at a distance from the ends of the sleeve, i.e. there remain lateral portions on which there is no adhesive. The right-hand lateral portion 12, with axial dimension P1, can therefore be coated during fabrication of the accessory with an antifriction material such as PTFE to minimize fretting corrosion phenomena after crimping. The left-hand lateral portion 13 near the fitting can include a groove 14 adapted to receive one or more seals (not shown) with no risk of getting adhesive on them.

The longitudinal dimension of the end lateral portion (P1) is in practice less than that of the portion (P2) coated with adhesive.

In the situation considered here in which the sleeve is crimped to the end of the pipe, the longitudinal dimension of the portion coated with adhesive is advantageously from 0.5 D to D, where D is the outside diameter of the pipe 2 to be crimped, i.e. the inside diameter of the sleeve. The ratio between these dimensions is preferably from 0.6 D to 0.9 D; in the example considered here of an accessory with an inside diameter of 19.05 mm, this dimension P2 is 13.25 mm i.e. 0.70 D. The longitudinal dimension P1 of the extreme lateral portion is advantageously from 0.5 D to D; in the example considered here it is 10.5 mm i.e. 0.55 D.

To simplify fabrication, the accessory includes only one portion coated with adhesive, but the accessory can alternatively include a number of axially offset portions coated with adhesive in this way, for example to prevent the crimped assembly from being too rigid, to the point in particular of having insufficient flexibility. As will be described with reference to FIG. 2, this advantage can be obtained without having to delimit multiple portions coated with adhesive.

To ensure a good axial fixing by virtue of the crimping, and also to achieve good concentration of stress within the portion coated with adhesive at the time of crimping, the sleeve advantageously includes, on its surface opposite that including the portion coated with adhesive, and thus on its external surface in the FIG. 1 example, an area 15, with longitudinal dimension P3, the longitudinal profile of which is corrugated so that the sleeve has localized variations of thickness. These corrugations are advantageously obtained by one or more depressions in the thickness of the sleeve i.e. these depressions are set back relative to the rest of the external surface of the sleeve. In an alternative that is not shown, they can be projections.

This corrugated area 15 advantageously has an at least approximately transverse plane of symmetry Q.

To be more precise, in the example considered here, this corrugated area is formed of an annular bead 15A disposed between two annular depressions 15B and 15C, which is a particularly simple geometry that has nevertheless proved effective.

It is equally advantageous if this corrugated area 15 is centered longitudinally vis-à-vis the portion 10 coated with adhesive situated on the other surface of the sleeve, i.e. if the plane Q is also at least approximately a plane of symmetry of the portion coated with adhesive.

From the dimensional point of view, this plane Q is advantageously at a distance from the free end of the sleeve from 0.5 D to 1.5 D. In the example of dimensions given below, the dimension P1 is from 0.90 D to D, to be more precise 0.92 D, i.e. 17.5 mm.

How to choose the amplitude of the corrugations as a function of the material constituting the sleeve (here a 6061 aluminum alloy) and the conditions of future crimping will be evident to the person skilled in the art. This amplitude is for example from 1% to 10% of the diameter D (typically of the order of 5%).

Figure 2:
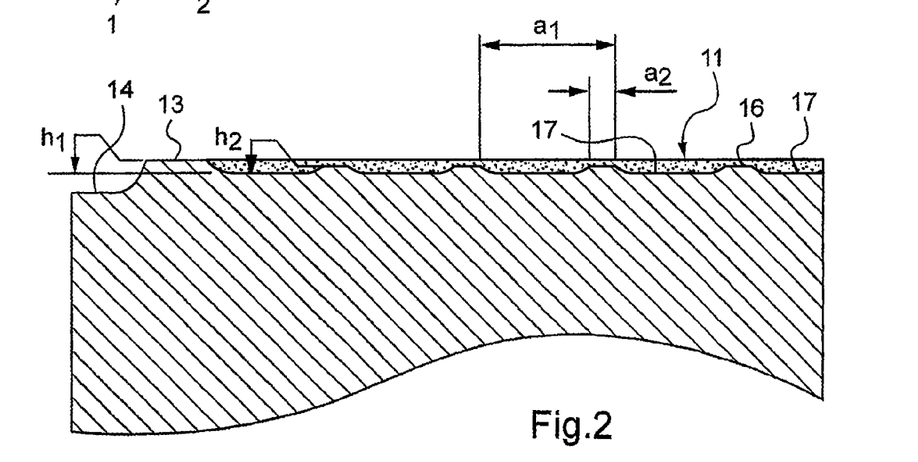
FIG. 2 is a view to a larger scale of the detail II from FIG. 1.

As FIG. 2 shows more particularly, the portion coated with adhesive is set back relative to the surface of the lateral portions between which this portion coated with adhesive lies. It is in this set back portion that there is disposed the layer of adhesive 11 including an encapsulated component, totally or partly filling this portion. The depth of this set back portion, denoted h1 in FIG. 2, is in practice chosen to enable the accumulation of a number of layers of capsules containing the encapsulated component; it is in practice of the order of one tenth of a millimeter, preferably from 0.05 to 0.2 mm.

This set back portion advantageously includes collars 16 projecting relative to adjacent recesses 17. These collars advantageously have a height less than the depth of the set back portion, in other words the dimension h2 in FIG. 2 is less than the dimension h1.

This height h2 preferably has a value from one to two thirds of h1, preferably half of it.

These collars also have a meaningful width, i.e., during crimping, the adhesive that covers these collars is compressed effectively without flowing toward the adjacent recesses. This width, denoted a2 in FIG. 2, preferably has a value from 10% to 30% (here 25%) of the pitch of the collars (the pitch is denoted a1 in FIG. 2); these collars are advantageously distributed in a regular or homogeneous (i.e. periodic) manner. The pitch preferably has a value from 5% to 10% of the inside diameter of the sleeve, for example 5%. The number of these collars is advantageously greater than 10, here of the order of 12.

It is clear that as a consequence of the presence of the collars good bonding is achieved provided that the capsules of adhesive are crushed at least on the tops of the collars. What is more, the fact that the number of capsules can be such that they are not crushed in the recesses can have the advantage that the adhesive in the recesses is less well polymerized than on the collars and thus constitute less rigid bonding areas, which can confer some flexibility on the crimped assembly. Note that this alternation of more or less strongly bonded areas offers advantages comparable to the situation of a number of separate portions coated with adhesive without having to overcome the problems of producing such separate portions coated with adhesive.

Note that the free end of the sleeve is tapered, as in various accessories already known.

Figure 3:
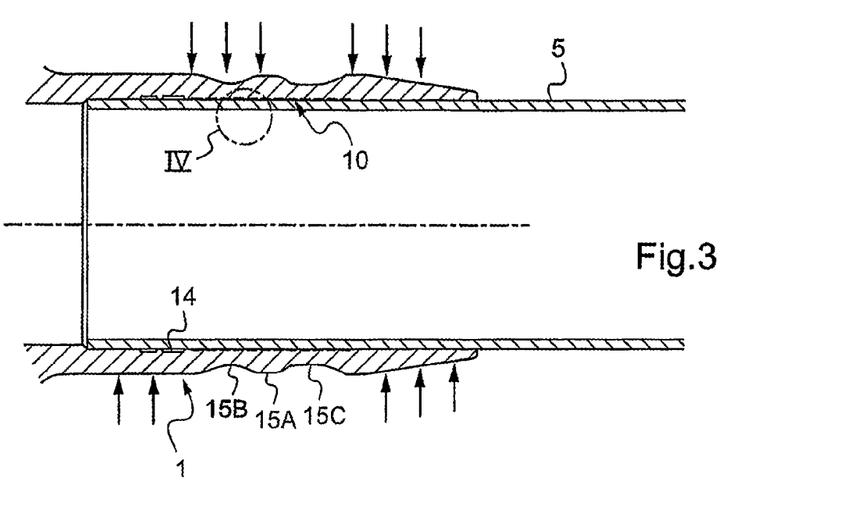
FIG. 3 is a partial view in axial section of the accessory after engagement over a pipe end before crimping.
Figure 4:
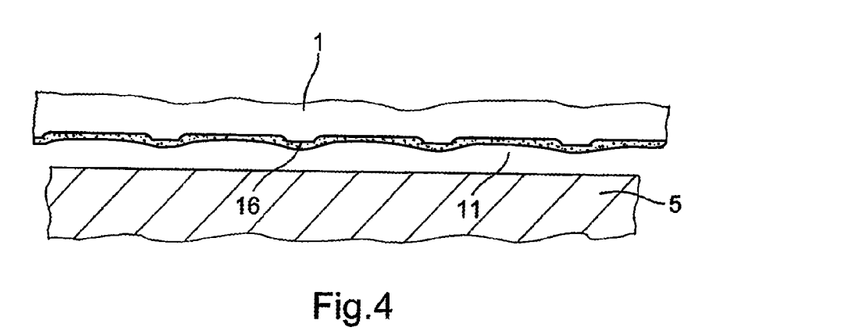
FIG. 4 is a view to a larger scale of the detail IV from FIG. 3.

FIGS. 3 and 4 represent an accessory according to FIGS. 1 and 2 about to be crimped to the end of a pipe or more generally of any tube.

The sleeve of the accessory is placed around that end, and it is seen in FIG. 4 that the layer of adhesive has corrugations because it follows the collars and the recesses forming the portion coated with adhesive.

Figure 5:
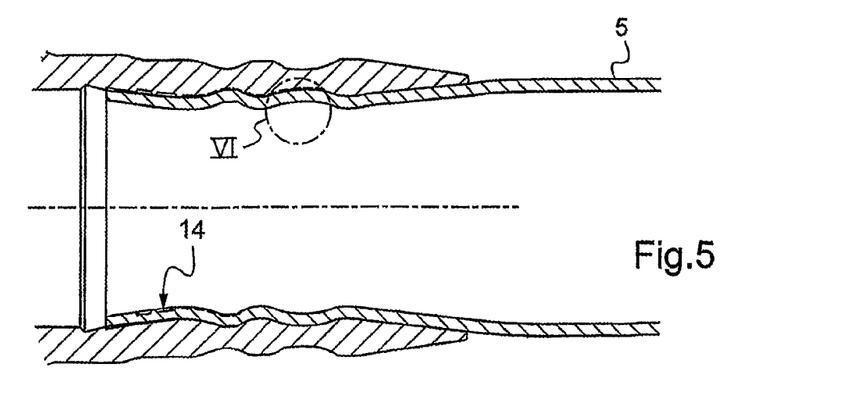
FIG. 5 is a partial view in axial section of the accessory after crimping to the end of the pipe.
Figure 6:
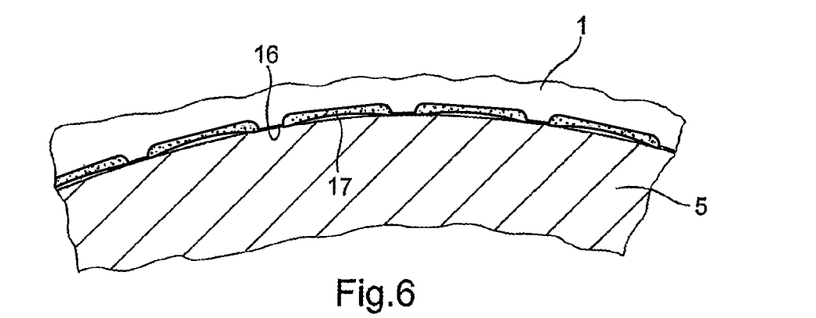
FIG. 6 is a view to a larger scale of the detail VI from FIG. 5.

FIGS. 5 and 6 show the assembly from FIG. 3 after crimping.

The profile of the external corrugated area has been reduced, while corrugations have appeared on the inside surface of the sleeve and in the end of the pipe. This contributes to good axial retention of this end in the sleeve.

As for the portion coated with adhesive, it is seen that the layer of adhesive has been strongly compressed on the tops of the collars (it is no longer seen in FIG. 6), whereas the adhesive may not even have been crushed at all in the recesses. This is an extreme case, as in practice it is found that the adhesive is also crushed (and therefore polymerized) in the recesses, but less so than on the collars.

Figure 7:
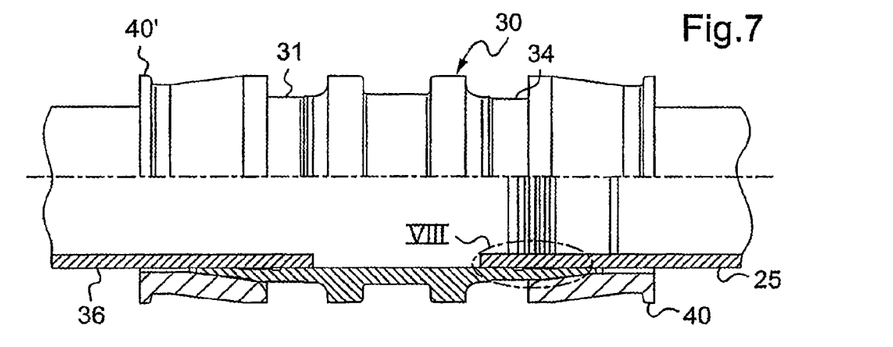
FIG. 7 is a view in axial section of another accessory, intended to be fixed by axial crimping.
Figure 8:
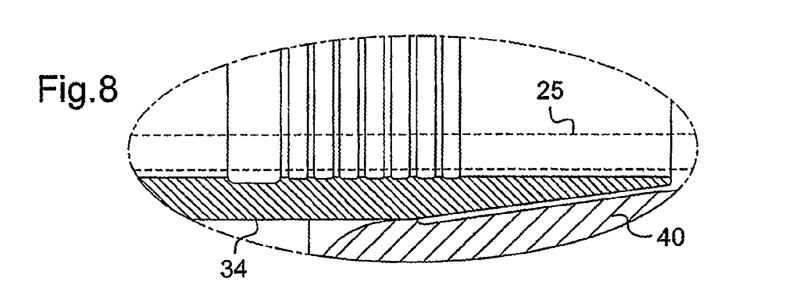
FIG. 8 is a view to a larger scale of the detail VIII from FIG. 7.
Figure 9:
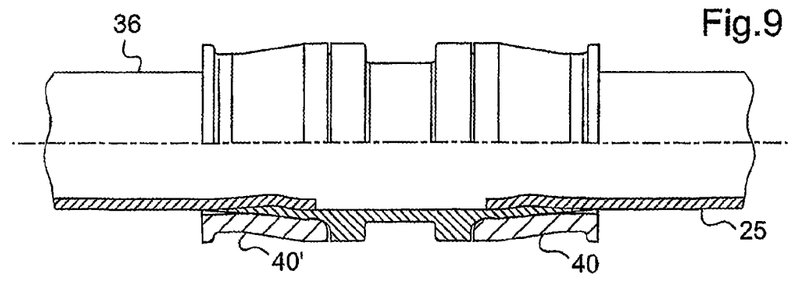
FIG. 9 is a view in section of the accessory from FIGS. 7 and 8 after crimping.

FIGS. 7 to 9 show another connection accessory 30 adapted to be crimped to the end of a pipe 25 of any type.

This accessory differs from that of the previous figures in that the sleeve 34 is extended by another sleeve 31, which is fastened to it. Note that crimping, rather than being effected radially, as in the previous figures, is effected axially, by pushing an annular punch 40 toward the left along the sleeve 34 (or by pushing a punch 40' toward the right in the case of the sleeve 31). The presence of a portion coated with adhesive having at least two components, one of which is encapsulated, also increases mechanical strength, especially in torsion, for each sleeve coated with adhesive in this way (it is evident that it is advantageous for each sleeve to be coated with adhesive).

To give an idea of orders of magnitude, compared to a standard basic accessory, for example as shown in the drawings of the document WO-82/02755 (without any adhesive and a simple depression on the surface opposite the surface coming into contact with the pipe end) having a torsion resistance defining a reference index 100:

the presence of the recommended adhesive, especially in the case of a portion that is set back, increases torsion resistance by approximately 50% to 100% of the reference index, the presence of a known attachment coating produces an increase over the reference index of the order of 100%, the presence of a central bead produces a further increase over the reference index of the order of 100%, the presence of collars as shown in FIGS. 1 and 2 produces a further increase of the order of 50% to 100%, i.e. a final torsion resistance varying from 400% to 500% of the reference index, which represents a very clear improvement over the torsion resistance of the standard accessory.

In the example considered here of a 6061 aluminum alloy connector crimped to a 12/16-inch (approximately 1.90 cm) aluminum tube, no separation occurred for loads of 60 N.m or above.

Figure 10:
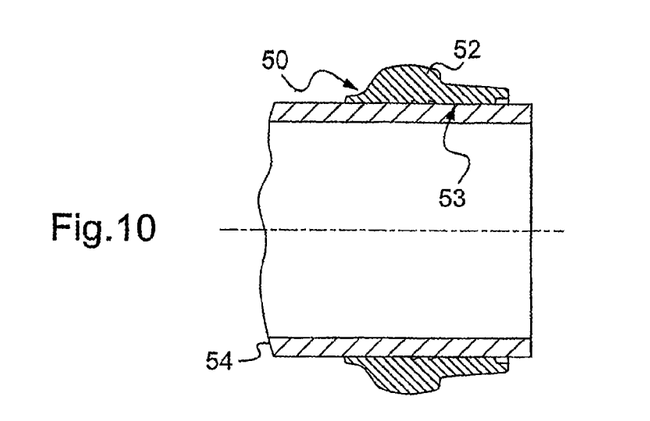
FIG. 10 is a view in axial section of a further connection accessory about to be crimped to the end of a pipe tube.
Figure 11:
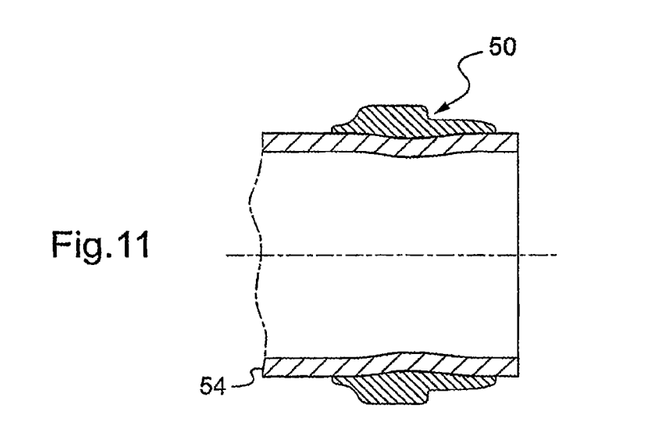
FIG. 11 is a view after crimping.
Figure 12:
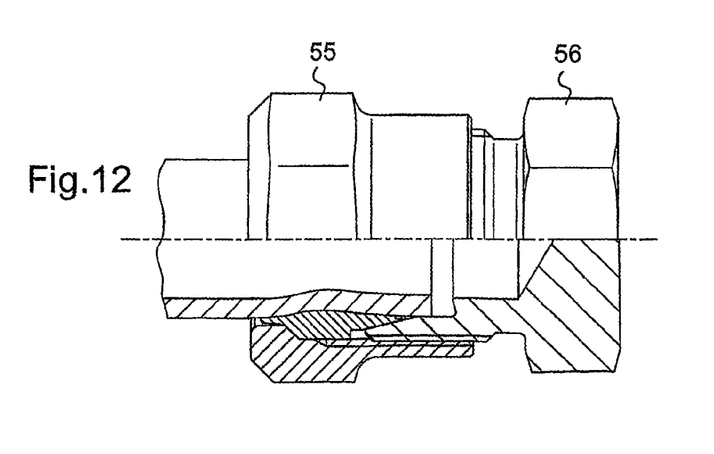
FIG. 12 is a view of the connector from FIG. 11 screwed to a fitting intended to cooperate with an end of a pipe tube.

FIGS. 10 to 12 show a third embodiment of the invention.

These figures show a connection accessory 50 formed primarily of a sleeve, which has externally a projecting convex portion 52 and a portion 53 coated with adhesive (see FIG. 10). The latter is crimped to the end of a pipe tube 54 (see FIG. 11) and then assembled by screwing of a nut-forming part 55 to a connecting fitting 56' for example one adapted to be fitted to an inlet/outlet fitting of a fluid device or a fitting mounted at the end of another pipe tube.

The components of the accessory of the invention are in practice made of metal (e.g. stainless steel, aluminum alloy, titanium or titanium alloy, copper or copper alloy). The sleeve and the fitting can be in metals of identical or different compositions, as required.

The invention claimed is:

1. A connection accessory (1, 30) for pipes, including a sleeve (4, 34) configured to be crimped to a free end of a pipe tube and configured to cooperate at least indirectly with another pipe element, wherein a first surface of the sleeve is configured to come into crimping contact with the free end of the pipe tube and includes at least one coated portion (10) coated with an activatable adhesive, the activatable adhesive comprising at least two components one of which is encapsulated, and wherein the at least one coated portion is set radially outward relative to the first surface of the sleeve, said first surface of the sleeve being on the side of a free end of the sleeve relative to the at least one coated portion.

2. The connection accessory according to claim 1, wherein the adhesive is polymerizable.

3. The connection accessory according to claim 2, wherein the adhesive is polymerizable by applying pressure.

4. The connection accessory according to claim 1, wherein the at least one portion coated with adhesive is at a distance from the ends of the sleeve.

5. The connection accessory according to claim 1, wherein there is only one portion (10) coated with adhesive.

6. The connection accessory according to claim 5, wherein the portion coated with adhesive is at a distance from the free end of the sleeve, facing the fitting, from approximately 0.5 D to approximately D, where D is the diameter of the surface of the sleeve including the portion coated with adhesive.

7. The connection accessory according to claim 5 wherein the portion coated with adhesive has a longitudinal dimension from 0.5 D to D, where D is the diameter of the surface of the sleeve including the portion coated with adhesive.

8. The connection accessory according to claim 7, wherein the longitudinal dimension of the portion coated with adhesive is from 0.6 D to 0.9 D.

9. The connection accessory according to claim 1 wherein the first surface is an inner surface of the sleeve, the sleeve has an area (15) with a corrugated longitudinal profile on an outer surface of the sleeve.

10. The connection accessory according to claim 9, wherein said corrugated area (15) has at least approximately a transverse plane (Q) of symmetry.

11. The connection accessory according to claim 10, wherein said transverse plane of symmetry is at a distance from the free end of the sleeve that is from 0.5 D to 1.5 D, where D is the diameter of said first surface.

12. The connection accessory according to claim 10 wherein said corrugated area is formed of an annular bead (15A) between two annular depressions (15B, 15C).

13. The connection accessory according to claim 9 wherein said corrugated area is centered longitudinally on the outer surface and with respect to the at least one coated portion of the inner surface.

14. The connection accessory according to claim 9 wherein the amplitude of the corrugations in said corrugated area is from the order of 1% to the order of 10% of the diameter of the outer surface.

15. The connection accessory according to claim 1 wherein the at least one coated portion (10) is set radially outward relative to the first surface of the sleeve on either side of the at least one coated portion.

16. The connection accessory according to claim 15, wherein a radial setting back distance of the at least one coated portion relative to the first surface of the sleeve on either side of the at least one coated portion is of the order of one tenth of a millimeter.

17. The connection accessory according to claim 16, wherein the at least one coated portion (10) includes projecting collars (16).

18. The connection accessory according to claim 17, wherein said collars have a height (h2) less than a setting back distance (h1).

19. The connection accessory according to claim 18, wherein the height of the collars has a value from one third to two thirds of the setting back distance.

20. The connection accessory according to claim 19, wherein the height of the collars has a value of approximately half the setting back distance.

21. The connection accessory according to claim 17 wherein the collars are distributed in a regular pattern.

22. The connection accessory according to claim 21, wherein the longitudinal dimension (a2) of the collars has a value from 10% to 30% of a pitch (a1) of the collars.

23. The connection accessory according to claim 22, wherein the longitudinal dimension of the collars has a value of approximately one quarter of said pitch.

24. The connection accessory according to claim 1 wherein the connection accessory consists primarily of said sleeve.

25. The connection accessory according to claim 1 further comprising a portion fastened to said sleeve intended to cooperate at least indirectly with another pipe tube.

26. The connection accessory according to claim 25, wherein said fastened-on portion is a second sleeve configured to be crimped to an end of said other pipe tube.

27. The connection accessory according to claim 25, wherein said fastened-on portion is a fitting intended to locate against a complementary fitting mounted on said other pipe tube.

* * * * *